(12) United States Patent
Britt, Jr. et al.

(10) Patent No.: US 8,554,249 B2
(45) Date of Patent: Oct. 8, 2013

(54) LOCATION SERVICE FOR WIRELESS DEVICES

(75) Inventors: Joe Freeman Britt, Jr., Los Gatos, CA (US); Pablo Calamera, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 444 days.

(21) Appl. No.: 12/633,440

(22) Filed: Dec. 8, 2009

(65) Prior Publication Data
US 2011/0136501 A1    Jun. 9, 2011

(51) Int. Cl.
  *H04W 24/00* (2009.01)
(52) U.S. Cl.
  USPC .......... 455/456.3; 455/456.1; 455/560; 455/404.2; 707/708; 342/463; 342/450
(58) Field of Classification Search
  USPC ......... 455/404.2, 456.1–457, 414.1, 414.3; 342/357.34, 450, 463–465; 707/708, 707/728, 705
  See application file for complete search history.

(56) References Cited

U.S. PATENT DOCUMENTS

| | | | |
|---|---|---|---|
| 7,295,556 B2 | 11/2007 | Roese et al. | |
| 7,305,245 B2 | 12/2007 | Alizadeh-Shabdiz et al. | |
| 8,112,096 B2 * | 2/2012 | Mazlum et al. | 455/456.1 |
| 8,150,420 B2 * | 4/2012 | Sun et al. | 455/456.3 |
| 2004/0259573 A1 * | 12/2004 | Cheng | 455/456.3 |
| 2008/0233916 A1 | 9/2008 | Wang et al. | |
| 2009/0005972 A1 | 1/2009 | de Koning et al. | |
| 2009/0098887 A1 * | 4/2009 | Baek | 455/456.1 |
| 2009/0233625 A1 | 9/2009 | Ferguson et al. | |
| 2009/0286549 A1 | 11/2009 | Canon et al. | |
| 2010/0285813 A1 * | 11/2010 | Harper | 455/456.1 |

OTHER PUBLICATIONS

Barbeau, Michel et al., "Improving Distance Based Geographic Location Techniques in Sensor Networks", *3rd International Conference on AD-HOC Networks & Wireless*, Available at <http://people.scs.carleton.ca/~kranakis/Papers/gps.pdf>, (Jul. 2004), pp. 1-14.

Johnson, Joel I., "Using the Skyhook Wireless XPS Positioning Service in Mangaged Code", Retrieved from: <http://www.codeproject.com/KB/mobile/WiMoWifiPosition.aspx> on Apr. 5, 2010, (Jan. 20, 2009), 14 pages.

Malik, OM "With Google's My Location, Who Needs a GPS?", Retrieved from: <http://gigaom.com/2007/11/28/google-my-location/> on Apr. 5, 2010, (Nov. 28, 2007), 31 pages.

* cited by examiner

*Primary Examiner* — Marcos Torress
(74) *Attorney, Agent, or Firm* — Wolfe-SBMC

(57) ABSTRACT

A location service for wireless devices is described. In embodiments, a connection identifier is received that indicates a wireless device is linked to a communication node for wireless communication. Additional wireless devices are also linked to the communication node for wireless communication, and the additional wireless devices can each identify its geographic location. Location data is received from the additional wireless devices, where the location data indicates the respective geographic locations of the additional wireless devices. A location of the communication node can be determined from the location data that is received from the additional wireless devices, and a current location can then be assigned to the wireless device based on the determined location of the communication node.

17 Claims, 6 Drawing Sheets

LOCATION SERVICE FOR WIRELESS DEVICES

BACKGROUND

Portable devices such as laptop computers, tablet PCs, ultra-mobile PCs, as well as other mobile data, messaging, and/or communication devices are becoming increasingly more common. Wireless devices are popular due to their portability, convenience, and ease of use. In addition, wireless devices have increasingly become part of everyday life, providing multiple functions and services such as wireless communication, location-based services, email, media content playback, electronic calendaring, Web-based applications, and many other functions and services that are available whenever convenient for a user. Some wireless devices may also include mapping systems and/or be configured with GPS (Global Positioning System) that facilitate a user of a device determining a current location or street address, getting directions to another location, and/or viewing a map of the surrounding area.

However, not all portable devices or cellular telephones are currently equipped with GPS capabilities and users typically have to purchase and carry an additional device in order to use GPS services. Additionally, GPS mapping may not always be accurate and may not be updated frequently enough. As a result, a GPS device may direct a user to a point of interest, such as a restaurant, which has moved or gone out of business, or may direct a user to the main entrance of a shopping mall when the actual location of a store that the user is wanting to find may be far away from the main entrance.

SUMMARY

This summary is provided to introduce simplified concepts of a location service for wireless devices that are further described below in the Detailed Description. This summary is not intended to identify essential features of the claimed subject matter, nor is it intended for use in determining the scope of the claimed subject matter.

A location service for wireless devices is described. In embodiments, a connection identifier is received that indicates a wireless device is linked to a communication node for wireless communication. Additional wireless devices are also linked to the communication node for wireless communication, and each additional wireless device can identify its geographic location. Location data is received from the additional wireless devices, where the location data indicates the respective geographic locations of the additional wireless devices. The location of the communication node is fixed, such as a cellular tower, and so may be used as an approximate location reference point for the wireless devices that communicate with it. A communication node identifier (e.g., visible at a wireless device) for a communication node may change, such as when a cellular operator renumbers their nodes. A map of which communication node identifiers correspond to which physical locations is often not available. Current location information from the wireless devices can then be used to update a database which maps communication node identifiers to physical locations.

In other embodiments, the additional wireless devices are each configured with GPS (Global Positioning System), and the location data that is received from the additional wireless devices includes GPS coordinates that indicate the respective geographic locations of the additional wireless devices. In some cases, a wireless device cannot communicate its location, either because the wireless device does not include GPS or is temporarily inoperable, and the current location that is assigned to the wireless device is estimated. The approximate current location of the wireless device can be estimated based on the determined location of the communication node. In an embodiment, the communication node is a cellular tower, the connection identifier is a Local Area Coverage (LAC) identifier that identifies the cellular tower, and the additional wireless devices are determined to be linked to the cellular tower based on the LAC identifier.

BRIEF DESCRIPTION OF THE DRAWINGS

Embodiments of a location service for wireless devices are described with reference to the following drawings. The same numbers are used throughout the drawings to reference like features and components.

DETAILED DESCRIPTION

Embodiments of a location service for wireless devices provide that the geographic location of a wireless communication device that does not have GPS (Global Positioning System) capabilities can be determined, or approximately determined. A wireless device may not have GPS capabilities if the wireless device is not configured for GPS, or when GPS capabilities are temporarily lost. The geographic location of a communications node can be determined from the GPS coordinates of devices that communicate with the communications node. An estimated location of a non-GPS enabled device can be determined from the location of communications nodes that the non-GPS enabled device communicates with. The estimated location of the non-GPS enabled device can be improved by correlating the data received from the GPS enabled devices with similar signal strengths to those communications nodes. In an implementation, the communication cells at a communication node can be determined at a wireless device, as well as the signal strength from the device to the node for each of the communication cells. This data can then be used to estimate the distance from the wireless device to each of the communication cells. Alternatively or in addition, a location service can query each of the communication cells to determine a signal strength for the wireless device at a communication cell. Alternatively or in addition, the GPS location data and/or the estimated location can be augmented with user-provided details about the locations.

Wireless devices, both those configured for GPS and non-GPS capable, receive a connection identifier when linked to a communication node of a wireless communication service for wireless communication. For example, a cellular phone can receive a Local Area Coverage (LAC) identifier from a cellular tower when linked to the cellular tower for wireless communication. The location service can receive the connection identifier from each of the wireless devices that are linked to the communication node and, in addition, receive location data (e.g., GPS coordinate data) from the wireless devices that are GPS capable. The location service can determine a geographic location of the communication node from the connection identifier and from the location data that is received from the wireless devices, and then estimate a location of the wireless communication device that does not have GPS capabilities.

While features and concepts of the described systems and methods for a location service for wireless devices can be implemented in any number of different environments, systems, and/or various configurations, embodiments of a location service for wireless devices are described in the context of the following example systems and environments.

Figure 1:
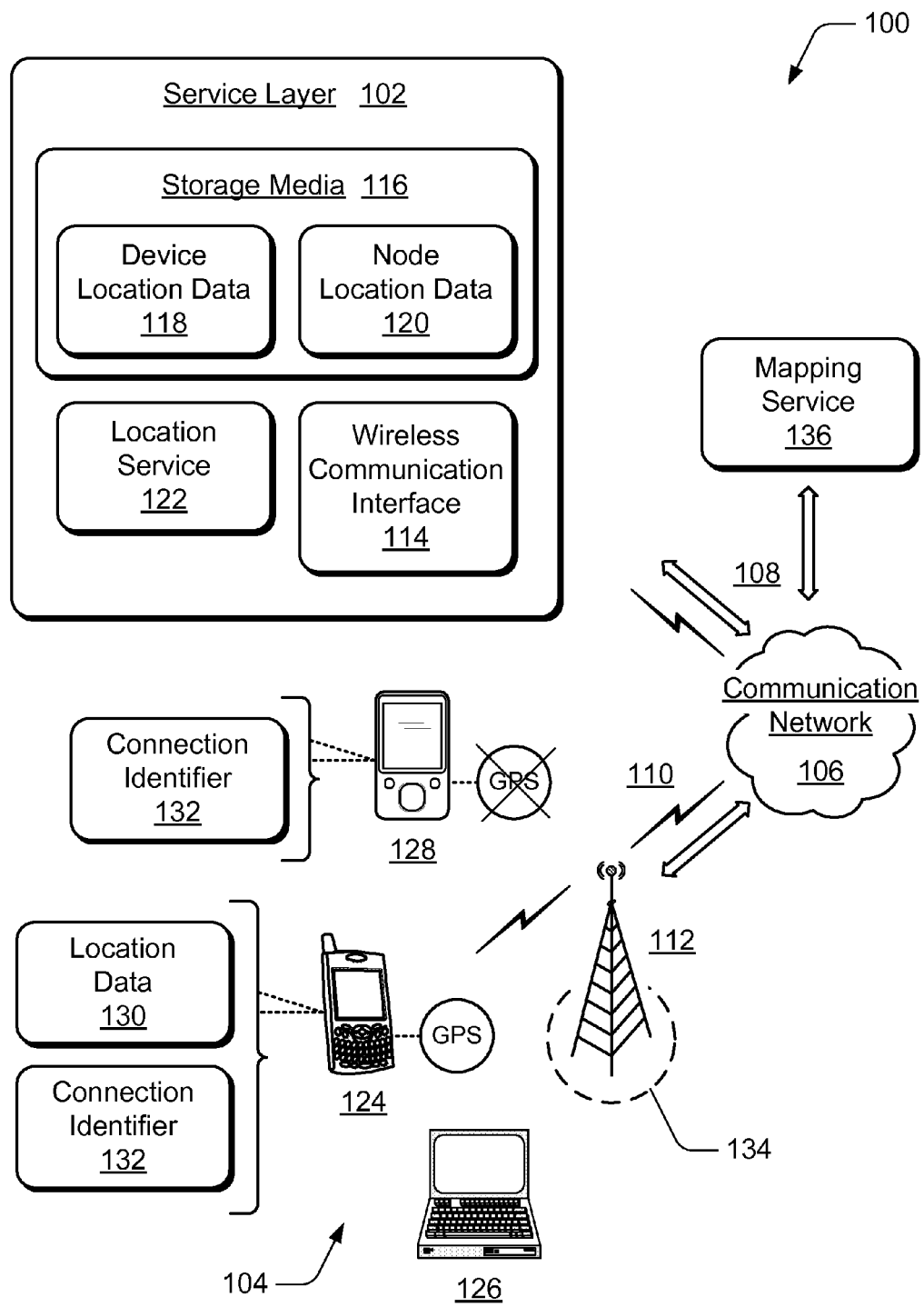
FIG. 1 illustrates an example system in which embodiments of a location service for wireless devices can be implemented.

FIG. 1 illustrates an example system 100 in which various embodiments of a location service for wireless devices can be implemented. In this example, system 100 includes a service layer 102 that can be configured to communicate or otherwise provide media assets and data to any number of various wireless devices 104 via a communication network 106. Some of the wireless devices 104 may also be referred to as portable devices and/or user devices, and some may be implemented as components in a client system of a media asset distribution system.

The communication network 106 can be implemented to include a broadcast network, an IP-based network 108, and/or a wireless network 110 that facilitates media asset distribution and data communication between the service layer 102 and any number of the various devices. The communication network 106 can be implemented as part of a media asset distribution system using any type of network topology and/or communication protocol, and can be represented or otherwise implemented as a combination of two or more networks. The communication network 106 can also include any number of communication nodes 112, such as a wireless access point or cellular tower for wireless communication.

The communication network 106 may also include a mobile operator network that is managed by a communication service provider, such as a cell-phone provider and/or Internet service provider, to facilitate mobile data and/or voice communications for any type of a wireless device or mobile phone (e.g., cellular, VoIP, WiFi, etc.). In this example, the service layer 102 includes a wireless communication interface 114 to facilitate wireless communication with the various wireless devices 104 via the communication network 106.

In this example, the service layer 102 includes storage media 116 to store or otherwise maintain various data, such as device location data 118 and node location data 120. The storage media 116 can be implemented as any type of memory, random access memory (RAM), a nonvolatile memory such as flash memory, read only memory (ROM), and/or other suitable electronic data storage. The device location data 118 correlates to the various wireless devices 104, and indicates a geographic location of each of the wireless devices. The device location data 118 can include an identifier of a wireless device 104 when registered with the service layer 102. An identifier can include any one or combination of a user identifier, a device identifier, a phone identifier, a phone number, and any other identifier that can be utilized to identify a device. The node location data 120 includes geographic locations of communication nodes of a wireless communication service (e.g., the service layer 102 in an embodiment).

The service layer 102 includes a location service 122 that can be implemented as computer-executable instructions and executed by processors to implement the various embodiments and/or features described herein. In addition, the service layer 102 can be implemented with any number and combination of differing components as further described with reference to the example device shown in FIG. 6. The location service 122, as well as other functionality described to implement embodiments of a location service for wireless devices, can also be provided as a service apart from the service layer 102 (e.g., on a separate server or by a third party service), or as a distributed service.

In this example system 100, the wireless devices 104 can include any type of device implemented to receive and/or communicate wireless data, such as any one or combination of a mobile phone 124 (e.g., cellular, VoIP, WiFi, etc.), a portable computer device 126, a media device 128 (e.g., a personal media player, portable media player, etc.), and/or any other wireless device that can be utilized for wireless communication. Any of the various wireless devices 104 can be implemented with one or more processors, communication components, memory components, signal processing and control circuits, and a media asset rendering system. Further, any of the wireless devices can be implemented with any number and combination of differing components as further described with reference to the example device shown in FIG. 2, and with reference to the example device shown in FIG. 6. A wireless device may also be associated with a user (i.e., a person) and/or an entity that operates the device.

Any of the various wireless devices 104 may or may not include a location application or positioning system, such as GPS (Global Positioning System). Some wireless devices 104, such as media device 128, may not be configured with GPS capabilities, while other wireless devices are configured with GPS, such as mobile phone 124. The wireless devices 104 that are configured with GPS can communicate location data 130 to the service layer 102 as GPS coordinates (e.g., a latitude and longitude) that indicate respective geographic locations of the wireless devices.

The location service 122 at the service layer 102 can receive the location data 130 that indicates the respective geographic locations of the wireless devices 104, and store the current location of each wireless device as the device location data 118. For example, mobile phone 124 (e.g., a wireless communication device) can periodically transmit GPS coordinate data (e.g., the location data 130) to the service layer 102 to be stored as the device location data 118. Alternatively or in addition, the location service 122 can initiate a request for the location data 130 from the wireless devices.

Any of the wireless devices 104 can be linked to the communication node 112 of a wireless communication service for wireless communication, such as via communication network 106. In this example, the communication node 112 is a cellular tower that is identified by a Local Area Coverage (LAC) identifier. The mobile phone 124 that is linked to the communication node 112 for wireless communication can receive connection identifier 132, such as the LAC identifier that corresponds to the communication node 112. Similarly, the media device 128 (e.g., a wireless communication device) that is linked to the communication node 112 for wireless communication can receive the same connection identifier 132, such as the LAC identifier, from the communication node 112. The location service 122 at the service layer 102 can then receive the connection identifier 132, such as the LAC identifier, from any one or more of the wireless devices. The connection identifier 132 indicates that mobile phone 124 and media device 128 are linked to communication node 112 for wireless communication.

A Local Area Coverage (LAC) identifier includes a mobile country code that identifies the country of the communication network; a mobile network code that identifies a cellular operator in the specific country; a cellular tower identifier that identifies the cellular tower in the communication network; and a cell identifier that identifies the cell of the cellular tower that a wireless device is linked for wireless communication. A cellular service provider typically has a mapping of its cellular towers and the corresponding LAC identifiers of the cellular towers in a geographical region. However, cellular service providers do not publish the locations and/or the LAC identifiers of the cellular towers. In addition, the LAC identifiers of the cellular towers may change when a new tower is added to a cellular network and/or when the cellular network is updated.

The location service 122 at the service layer 102 can receive both the location data 130 that indicates the geographic location of the mobile phone 124 and the connection identifier 132. The location data and connection identifiers that correspond to communication nodes can be combined to create a listing of known communication node identifiers and locations which are then stored as the node location data 120. The location service 122 can continue to store and update the list of locations and connection identifiers for known communication nodes. Alternatively or in addition, the list can be updated when a new location of a communication node is determined, or when a location of a communication node does not match the previously stored node location data 120 for the communication node.

The location service 122 at the service layer 102 can be implemented to determine, or approximately determine, the geographic location of the wireless devices 104 that do not have GPS capabilities, such as media device 128. A wireless device may not have GPS capabilities if the wireless device is not configured for GPS, or when GPS capabilities are temporarily lost, such as when a wireless device does not have line-of-sight to a GPS transmission signal. The location service 122 can determine the wireless devices 104 that are linked to the communication node 112 based on the LAC identifier, and then determine a geographic location 134 of the communication node from the location data that is received from the wireless devices. In an implementation, the location service 122 can calculate an average latitude and longitude of the wireless devices that are linked for wireless communication to the same cellular tower to estimate a geographic location of the cellular tower.

The location service 122 can then assign a current location to the media device 128 based on the determined geographic location of the communication node 112. The current location of the media device 128 can be estimated based on the location of the communication node. In an implementation, the location service 122 can also estimate the distance from the media device 128 to the communication node 112 based on the observed signal strength from the media device 128 to the communication node 112 and/or based on a reported signal strength from the communication node 112 to the media device 128. The current location of the wireless device can then be assigned based on the determined location of the communication node 112 and the estimated distance from the wireless device.

The example system 100 also includes a mapping service 136 that communicates with the location service 122 at the service layer 102 via the communication network 106. The mapping service 136 is an example of an Internet-based mapping site. In addition to generating location mappings of cellular towers and wireless devices 104 having GPS capabilities, the location service 122 can be implemented to generate a detailed mapping of surroundings for wireless devices from the location data 130. The location service 122 can request a default map of a region or area from the mapping service 136. When mapping data for the region or area in which a wireless device 104 is located does not have a fine granularity of data related to points of interest and/or the when the data is out of date, the location service 122 can update the mapping data.

In an implementation, information used to update the mapping data can be requested and obtained from a user via a wireless device. For example, a user can provide an input via a wireless device of a current point of interest, such as where the user is currently located. The user can input information such as the name of a business, a type of the business, or the street address via a wireless device that communicates the information to the location service 122 at the service layer 102. This information, along with the location data 130 that indicates a current location of the wireless device, can be communicated to the location service 122. If an entry for the point of interest already exists in the mapping, then the new information can be added to the existing mapping data. However, if the point of interest does not exist in the mapping, then a new entry can be created, and the location data and the new information is associated with the point of interest. As more location data is added for a particular point of interest, the location service 122 can more closely update and/or define a location and/or boundary of the point of interest.

In an embodiment, the location service 122 can maintain a log of the day and time when locations are reported by a specific wireless device 104. The location service 122 can then periodically search for patterns related to when the wireless device reports a location for a specific point of interest. The location service 122 can then request the wireless device to report a location at a particular time and/or on a particular day of the week to obtain additional location data about the specific point of interest. If the new location data indicates a location or position that is within a predetermined distance from the previously stored location points, then the new location data can be added to the previously stored location data. Over time, less user input is requested as the wireless devices report the location data to the location service 122.

The location service 122 may not receive location data from wireless devices that are located indoors because GPS signals are received when a line-of-sight to a GPS satellite exists in order to calculate a latitude and longitude for a device. As such, the location data available from a wireless device that is located inside a business or residence may be little, if any. In an embodiment, a wireless device 104 can still report location data for a business or residence to the location service 122 even when a current location cannot be resolved for the device.

A wireless device 104 can store a last computed location for the device, such as just before the wireless device loses contact with a GPS satellite. When the location of the wireless device is reported to the location service 122, the last computed location for the wireless device can be communicated to the location service 122 as the location data. Typically, the last computed location of the wireless device will be close to the entrance of a specific point of interest. Therefore, as more wireless devices report a last computed location for a point of interest, the location service 122 can estimate that the entrance to the point of interest is at a location close to the reported locations.

Figure 2:
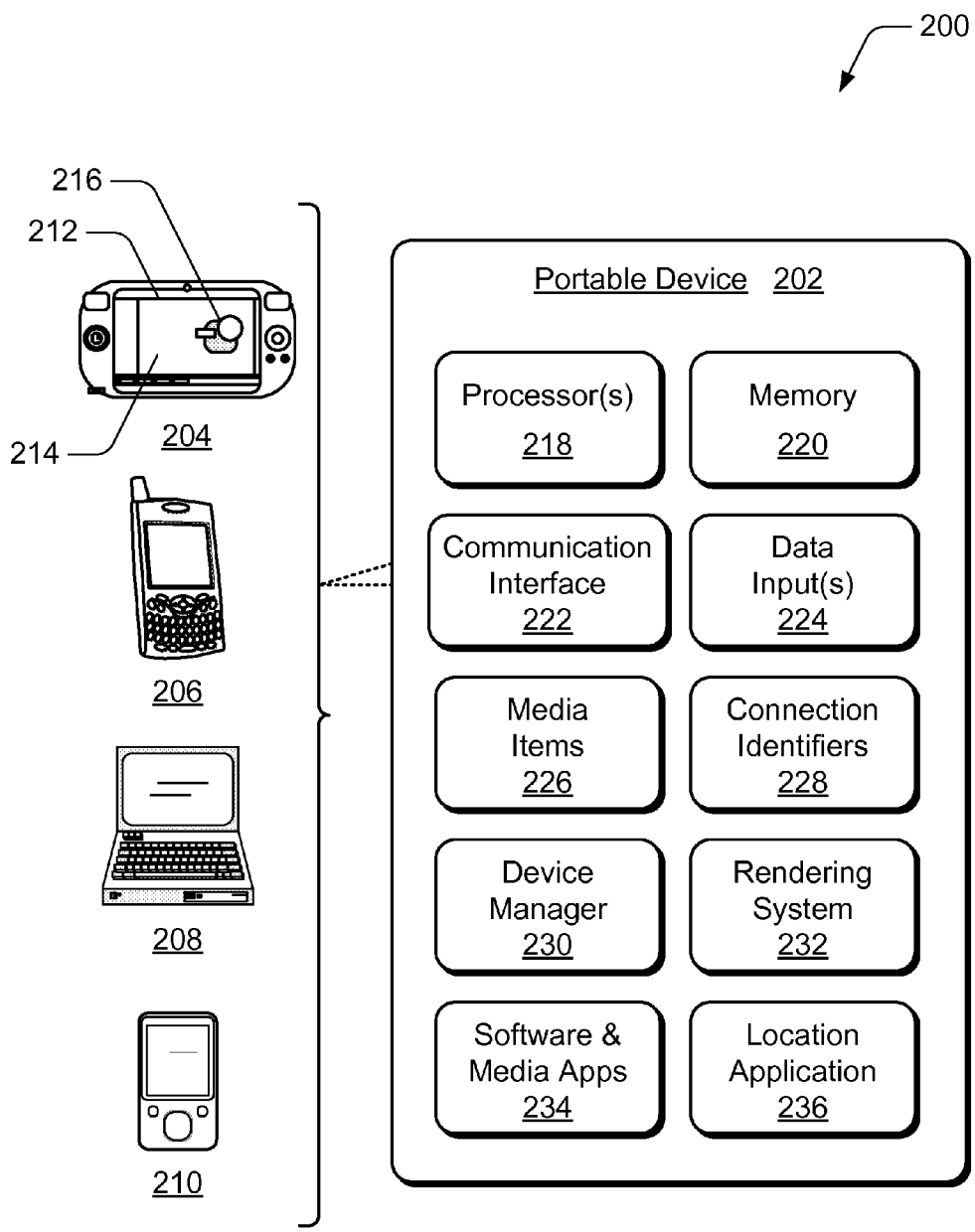
FIG. 2 illustrates an example portable device in which embodiments of a location service for wireless devices can be implemented.

FIG. 2 illustrates an example system 200 in which various embodiments of a location service for wireless devices can be implemented. Example system 200 includes a portable device 202 (e.g., a wired and/or wireless device) that can be any one or combination of a mobile personal computer 204, a personal digital assistant (PDA), a mobile phone 206 (e.g., cellular, VoIP, WiFi, etc.) that is implemented for data, messaging, and/or voice communications, a portable computer device 208 (e.g., a laptop computer, a laptop computer with a touch-screen, etc.), a media device 210 (e.g., a personal media player, portable media player, etc.), a gaming device, an appliance device, an electronic device, and/or any other type of portable device that can receive, display, and/or communicate data in any form of audio, video, and/or image data.

Each of the various portable devices (e.g., also referred to as client devices and/or user devices) can include an integrated display and/or an integrated touch-screen, as well as selectable input controls via which a user can input data and/or selections. For example, mobile personal computer 204 includes an integrated touch-screen 212 on which a user interface 214 can be displayed that includes displayable objects and/or user interface elements 216, such as any type of an icon, image, graphic, text, selectable button, user-selectable control, menu selection, map element, and/or any other type of user interface displayable feature or item.

Any of the various portable devices described herein can be implemented with one or more sensors, processors, communication components, data inputs, memory components, storage media, processing and control circuits, and/or a content rendering system. Any of the portable devices can also be implemented for communication via communication networks that can include any type of a data network, voice network, broadcast network, an IP-based network, and/or a wireless network that facilitates data, messaging, and/or voice communications. A portable device can also be implemented with any number and combination of differing components as described with reference to the example device shown in FIG. 6. A portable device may also be associated with a user (i.e., a person) and/or an entity that operates the device such that a portable device describes logical devices that include users, software, and/or a combination of devices.

In this example, portable device 202 includes one or more processors 218 (e.g., any of microprocessors, controllers, and the like), a memory 220, a communication interface 222 for data, messaging, and/or voice communications, and data inputs 224 to receive media items 226 and/or media content. Media items can include any type of email messages, text messages, digital photos, song selections, and the like. Media content (e.g., to include recorded media content) can include any type of audio, video, and/or image data received from any media content or data source, such as messages, television media content, music, video clips, data feeds, interactive games, network-based applications, and any other content. The data inputs 224 also receive connection identifiers 228 (e.g., a Local Area Coverage identifier) when the portable device 202 has an established communication link with a communication node for wireless communication.

Portable device 202 is implemented with a device manager 230 that includes any one or combination of a control application, software application, signal processing and control module, code that is native to the particular device, and/or a hardware abstraction layer for the particular device. Portable device 202 also includes a rendering system 232 to render user interfaces and user interface elements for display on any of the portable devices. The rendering system 232 is also implemented to receive and render any form of audio, video, and/or image data received from any media content and/or data source.

Portable device 202 includes various software and/or media applications 234 that may incorporate components and/or modules that can be processed or otherwise executed by the processors 218. The media applications 234 can include a music and/or video player, a Web browser, an email application, a messaging application, a photo viewer, and the like. The portable device 202 also includes a location application 236 to implement various embodiments of a location service for wireless devices as described herein. For example, the location application 236 can be implemented as GPS (Global Positioning System) to communicate with the location service 122 at the service layer 102 as shown in FIG. 1.

Example methods 300 and 400 are described with reference to respective FIGS. 3 and 4 in accordance with one or more embodiments of a location service for wireless devices. Generally, any of the functions, methods, procedures, components, and modules described herein can be implemented using hardware, software, firmware, fixed logic circuitry, manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The methods may also be practiced in a distributed computing environment by processing devices that are linked through a communication network. In a distributed computing environment, computer-executable instructions may be located in both local and remote computer storage media and/or devices. Further, the features described herein are platform-independent and can be implemented on a variety of computing platforms having a variety of processors.

Figure 3:
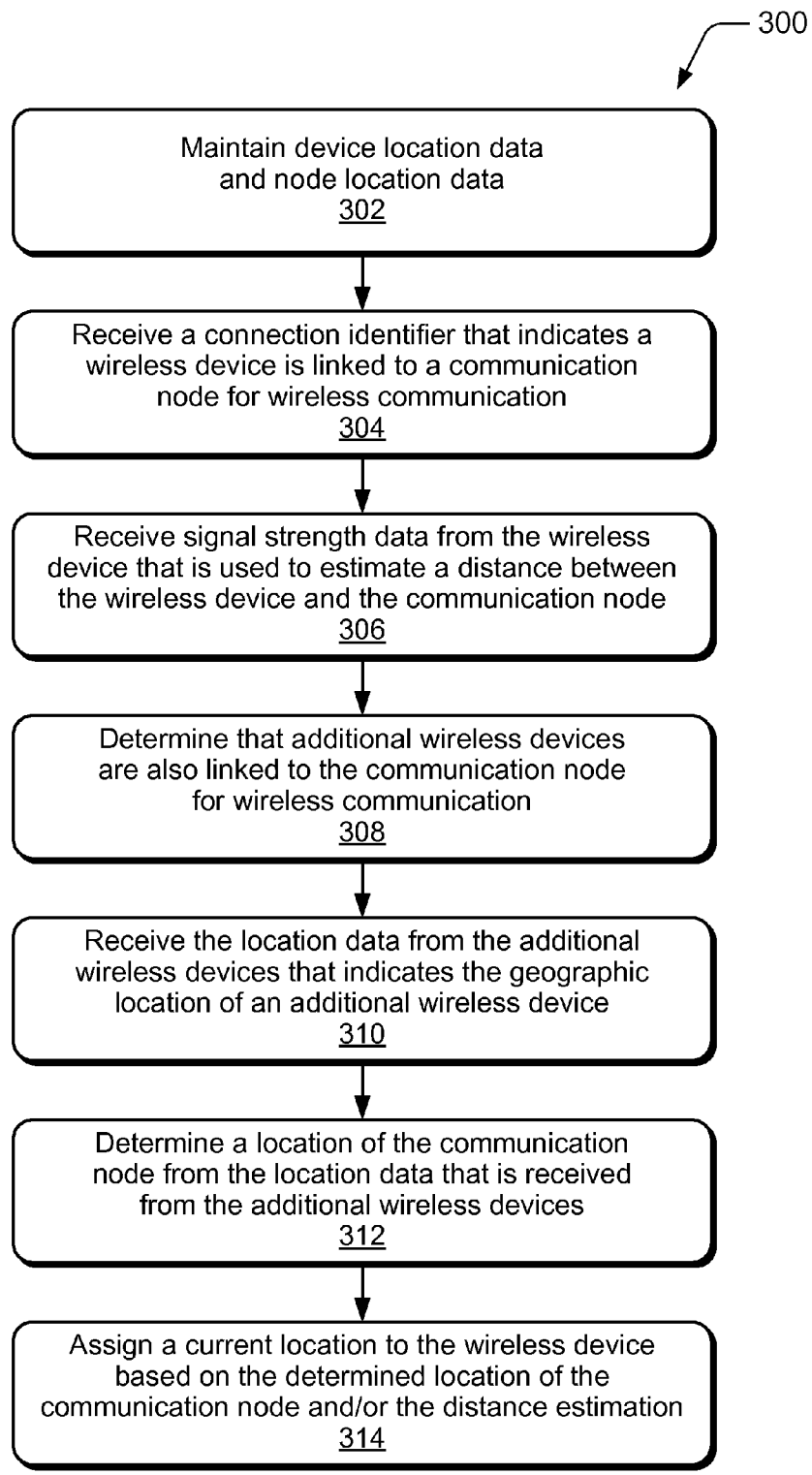
FIG. 3 illustrates example method(s) of a location service for wireless devices in accordance with one or more embodiments.

FIG. 3 illustrates example method(s) 300 of a location service for wireless devices. The order in which the method blocks are described are not intended to be construed as a limitation, and any number of the described method blocks can be combined in any order to implement a method, or an alternate method.

At block 302, device location data and node location data is maintained. For example, the service layer 102 maintains a database of device location data 118 that includes the respective geographic locations of the various wireless devices 104. The service layer 102 also maintains a database of node location data 120 that includes geographic locations of communication nodes of a wireless communication service, such as geographic location 134 of the communication node 112 (e.g., a cellular tower).

At block 304, a connection identifier is received that indicates a wireless device is linked to a communication node for wireless communication. For example, the location service 122 at service layer 102 receives the connection identifier 132 from media device 128, and the connection identifier corresponds to the communication node 112 which indicates that the wireless device is linked to the communication node for wireless communication. For example, the communication node 112 is a cellular tower and the connection identifier 132 is a Local Area Coverage (LAC) identifier that identifies the cellular tower. The location service 122 determines, or approximately determines, the geographic location of wireless devices that do not have GPS capabilities, such as media device 128.

At block 306, signal strength data is received from the wireless device that can be used to estimate a distance between the wireless device and the communication node. For example, the location service 122 at service layer 102 receives communication node-to-device signal strength information from the media device 128. The location service 122 also receives device-to-communication node signal strength information from the communication node. Multiple communication nodes may be on the same cellular network. The wireless device can also report which of the other communication nodes it is able to communicate with, and the signal strengths associated with each of them. The location service 122 can then request device-to-communication node signal strengths from each communication node that the wireless device is able to communicate with. That signal strength data can be used with the physical locations of the communication nodes to estimate the physical location of the wireless device.

At block 308, additional wireless devices are determined that are also linked to the communication node for wireless communication. For example, the location service 122 determines that other wireless devices 104 are also linked to the communication node 112 for wireless communication based on the connection identifier 132, such as the LAC identifier. In an implementation, the location service 122 queries the database of device location data 118 and the node location data 120 to determine if a current location is known for the communication node 112 (e.g., a cellular tower) having the same connection identifier. The location service 122 also determines if the mapping of communication node identifiers has changed by retrieving the locations of the wireless devices that are currently linked to the communication node and matching those locations to the stored location for the communication node. If the mapping has changed, the node location data 120 is updated to reflect the change. If a communication node location is not known for a particular connection identifier, then the location service 122 locates other wireless devices with a known location that are linked to the communication node for wireless communication.

At block 310, the location data is received from the additional wireless devices that indicates the respective geographic locations of the additional wireless devices. For example, the location service 122 at service layer 102 receives the location data 130 from the wireless devices 104 that are configured with GPS, and the location data identifies the respective geographic locations of the wireless devices. The location data 130 can include GPS coordinates that indicate the geographic location of a wireless device. In an embodiment, the location service 122 requests the location data 130 from the wireless devices.

In an implementation, the location service 122 calculates an average of the locations of the wireless devices to determine the geographic location 134 of the communication node 112, such as a cellular tower. For example, multiple cellular towers may offer coverage over the same region or area and, as a result, a given wireless device may not be linked for wireless communication to the closest cellular tower. This is because a wireless device that is linked to one tower will not switch from that tower to another tower until the signal quality from the original tower reaches a minimum threshold.

To compensate for this, the location service 122 can apply a filter to remove wireless devices from the calculation that have locations which are outside of a threshold of the average location of the wireless devices that are linked to the same cell tower. Other techniques may also be utilized to compensate for outlier devices, such as a neural network algorithm or a weighted average. In an embodiment, the location service 122 may also apply a voting algorithm to determine and/or estimate a location of a communication node, such as a weighted average, simple average, neural network algorithm, and the like.

In addition, the location service 122 determines a cell identifier from the LAC identifier so as to determine which particular cell of the cellular tower the wireless device is linked to for wireless communication. Typical cellular towers have additional cells positioned around the tower. Therefore, the signal strengths observed at the device for all cells with which the device can communicate can be used to estimate the physical location of the device. The cell directions can also be utilized to determine the location of the cellular tower by accounting for skew when more wireless devices are linked to one side of the cellular tower than another side, such as may occur when a direction from the cellular tower is more heavily populated when the cellular tower is located on the edge of a city or on the side of a mountain.

At block 312, a location of the communication node is determined from the location data that is received from the additional wireless devices. For example, the location service 122 determines the wireless devices that are linked to the communication node 112 based on the LAC identifier, and then determines the geographic location 134 of the communication node from the location data 130 that is received from the wireless devices. In an implementation, the location service 122 extrapolates from the location data 130 to approximately determine the location of the communication node.

At block 314, a current location is assigned to the wireless device based on the determined location of the communication node and/or based on the distance estimation received from the wireless device. For example, the location service 122 assigns a current location to the media device 128 based on the determined geographic location 134 of the communication node 112 and/or based on the distance estimation received from the media device. The media device 128 does not communicate a GPS signal and the current location of the media device 128 is estimated based on an approximation of the determined location of the communication node.

Figure 4:
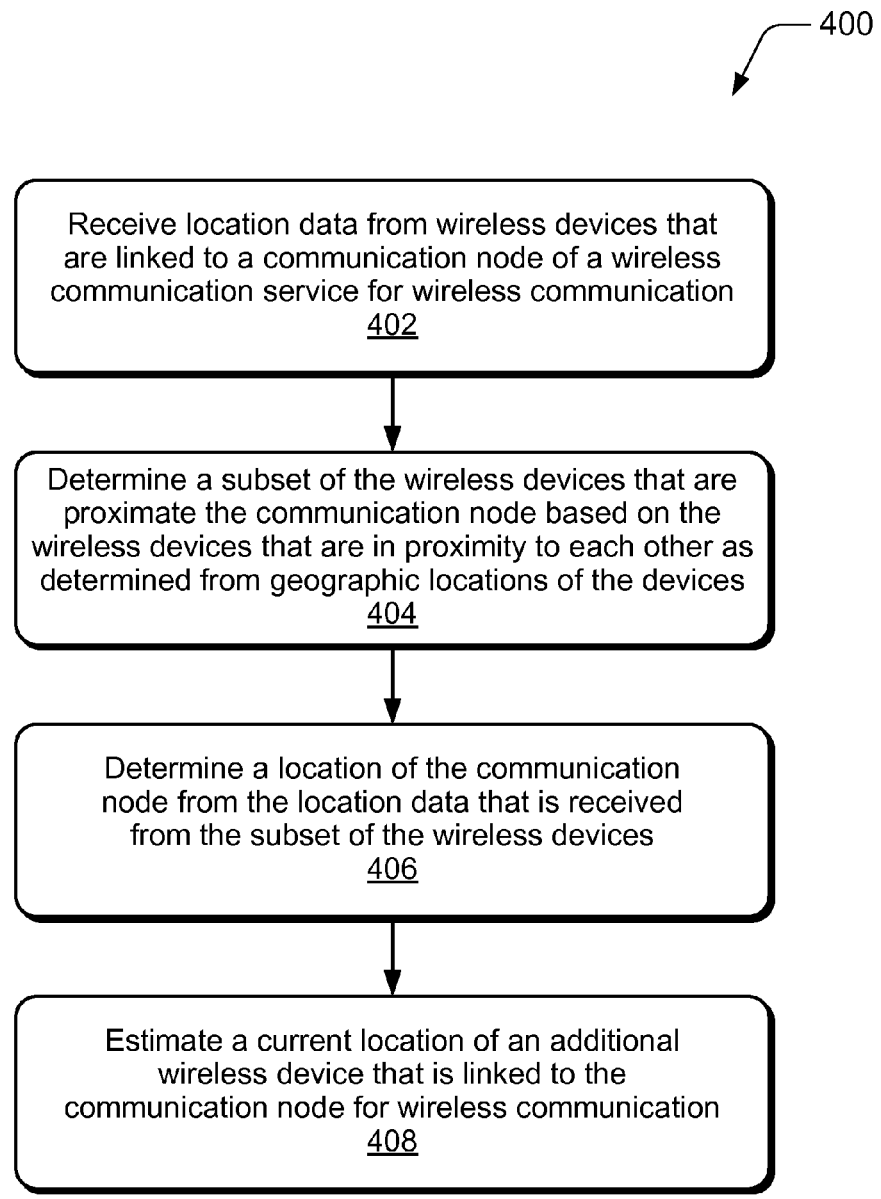
FIG. 4 illustrates additional example method(s) of a location service for wireless devices in accordance with one or more embodiments.

FIG. 4 illustrates example method(s) 400 of a location service for wireless devices. The order in which the method blocks are described are not intended to be construed as a limitation, and any number of the described method blocks can be combined in any order to implement a method, or an alternate method.

At block 402, location data is received from wireless devices that are linked to a communication node of a wireless communication service for wireless communication. For example, the location service 122 at service layer 102 receives the location data 130 from the wireless devices 104 that are configured with GPS, and the location data identifies the respective geographic locations of the wireless devices.

At block 404, a subset of the wireless devices that are proximate the communication node is determined based on the wireless devices that are in proximity to each other as determined from geographic locations of the wireless devices. For example, the location service 122 at service layer 102 determines the wireless devices that are proximate the communication node 112 and that are in proximity to each other. This may include estimating a perimeter around the communication node 112 to determine the subset of the wireless devices 104 that are proximate the communication node.

At block 406, a location of the communication node is determined from the location data that is received from the subset of the wireless devices. For example, the location service 122 determines the geographic location 134 of the communication node from the location data 130 that is received from the wireless devices. At block 408, a current location of an additional wireless device that is linked to the communication node for wireless communication is estimated. For example, the location service 122 estimates a current location of the media device 128 (e.g., that does not communicate a GPS signal) based on the determined geographic location 134 of the communication node 112.

Figure 5:
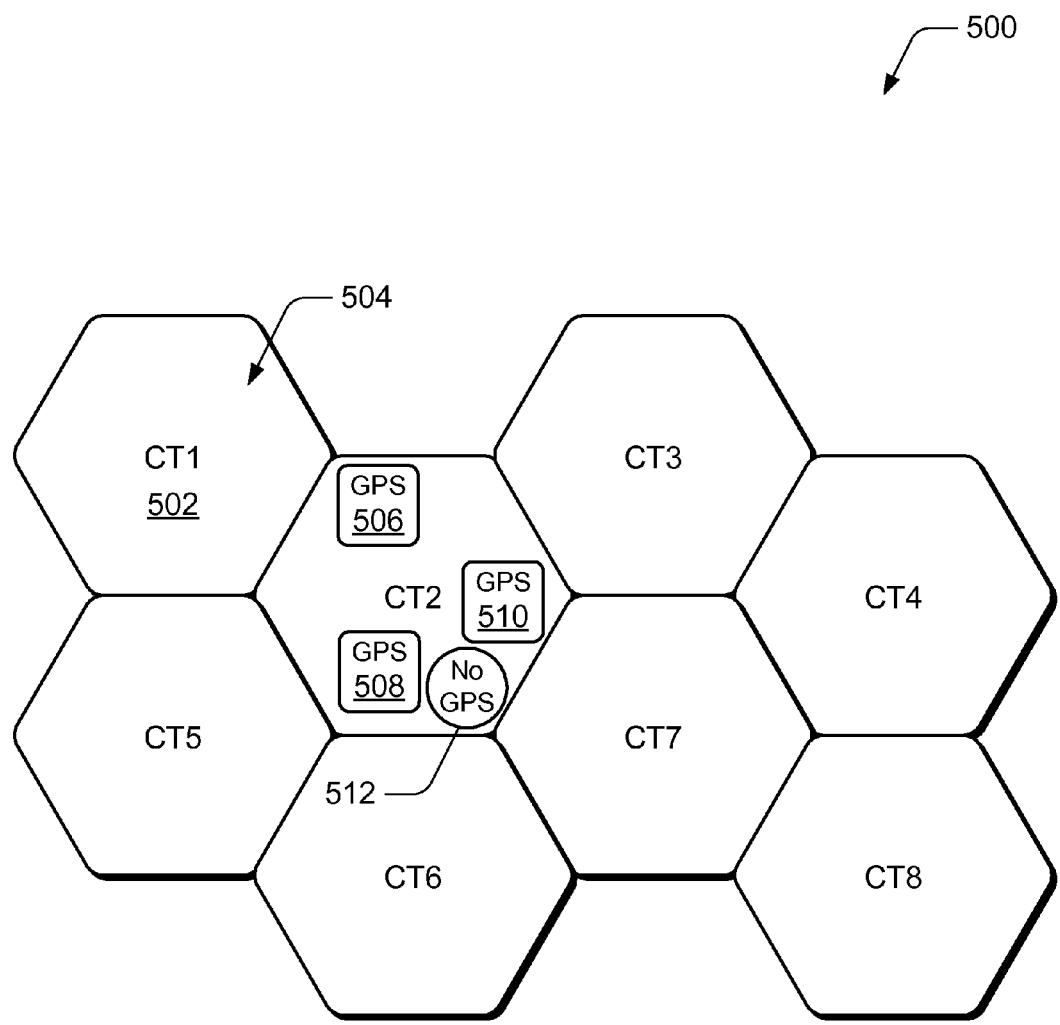
FIG. 5 illustrates an example configuration of communication nodes and wireless devices in accordance with one or more embodiments.

FIG. 5 illustrates an example configuration 500 of communication nodes (e.g., cellular towers) and various wireless devices. This example includes several cellular towers 502 that are identified as CT1 through CT8, and each cellular tower covers an approximate coverage area 504 for communication with the wireless devices. The various wireless devices include devices 506, 508, and 510 that are GPS enabled, and include a non-enabled GPS device 512. Wireless devices 508, 510, and 512 have approximately the same signal strength to cellular towers CT2, CT6, and CT7. By correlating the signal strengths for wireless devices 508, 510, and 512, the location service 122 (FIG. 1) can infer or otherwise determine that the non-enabled GPS device 512 is in approximately the same location as wireless devices 508 and 510.

Figure 6:
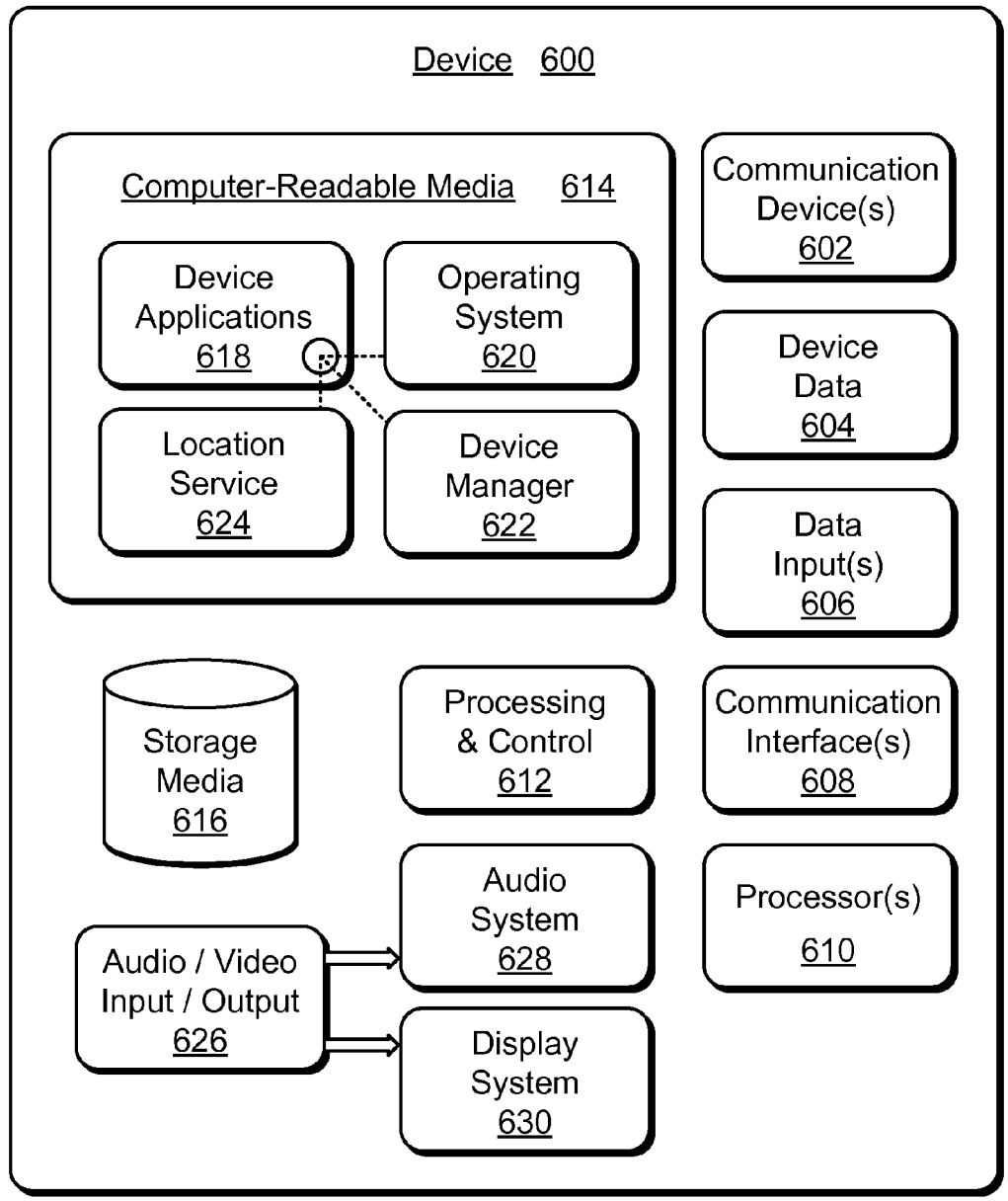
FIG. 6 illustrates various components of an example device that can implement embodiments of a location service for wireless devices.

FIG. 6 illustrates various components of an example device 600 that can be implemented as any type of device and/or service layer as described with reference to FIGS. 1 and 2 to implement embodiments of a location service for wireless devices. In embodiments, device 600 can be implemented as any one or combination of a wired and/or wireless device, as any form of consumer device, computer device, server device, portable computer device, user device, communication device, video processing and/or rendering device, appliance device, gaming device, electronic device, and/or as any other type of device. Device 600 may also be associated with a user (i.e., a person) and/or an entity that operates the device such that a device describes logical devices that include users, software, firmware, and/or a combination of devices.

Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608 that can be implemented as any one or more of a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like) which process various computer-executable instructions to control the operation of device 600 and to implement embodiments of a location service for wireless devices. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable media 614 provides data storage mechanisms to store the device data 604, as well as various device applications 618 and any other types of information and/or data related to operational aspects of device 600. For example, an operating system 620 can be maintained as a computer application with the computer-readable media 614 and executed on processors 610. The device applications 618 can include a device manager 622 (e.g., a control application, software application, signal processing and control module, code that is native to a particular device, a hardware abstraction layer for a particular device, etc.). The device applications 618 also include any system components or modules to implement embodiments of a location service for wireless devices. In this example, the device applications 618 include a location service 624 when device 600 is implemented as a server device or service layer. The location service 624 is shown as a software module and/or computer application. Alternatively or in addition, the location service 624 can be implemented as hardware, software, firmware, or any combination thereof.

Device 600 also includes an audio and/or video input-output system 626 that provides audio data to an audio system 628 and/or provides video data to a display system 630. The audio system 628 and/or the display system 630 can include any devices that process, display, and/or otherwise render audio, video, and image data. Video signals and audio signals can be communicated from device 600 to an audio device and/or to a display device via an RF (radio frequency) link, S-video link, composite video link, component video link, DVI (digital video interface), analog audio connection, or other similar communication link. In an embodiment, the audio system 628 and/or the display system 630 are implemented as external components to device 600. Alternatively, the audio system 628 and/or the display system 630 are implemented as integrated components of example device 600.

Although embodiments of a location service for wireless devices have been described in language specific to features and/or methods, it is to be understood that the subject of the appended claims is not necessarily limited to the specific features or methods described. Rather, the specific features and methods are disclosed as example implementations of a location service for wireless devices.

The invention claimed is:

1. A computer-implemented method, comprising:

receiving, by a location service at a service layer in communication with a communication node via a communication network, a connection identifier that indicates a wireless device is linked to the communication node for wireless communication;

querying a database that includes one or more connection identifiers including the connection identifier that indicates the wireless device is linked to the communication node;

determining, based on the connection identifier included in the database, that one or more additional wireless devices are also linked to the communication node for wireless communication, the one or more additional wireless devices each configured to identify its geographic location;

receiving location data from one or more of the additional wireless devices, the location data indicating the geographic location of the one or more additional wireless devices;

determining a location of the communication node from the location data that is received from the one or more additional wireless devices;

assigning a current location to the wireless device based on the determined location of the communication node;

receiving input information provided by a user of the wireless device, the input information including a name of a point of interest;

storing the current location of the wireless device and the input information as an entry with the location service;

aggregating the entry with one or more other entries describing the point of interest; and updating a boundary associated with the point of interest.

2. A method as recited in claim 1, further comprising requesting the location data from the one or more additional wireless devices.

3. A method as recited in claim 1, further comprising extrapolating from the location data that is received from the one or more additional wireless devices to determine the location of the communication node.

4. A method as recited in claim 1, wherein the current location of the wireless device is an estimated location based on signal strengths between the wireless device and one or more communication nodes.

5. A method as recited in claim 1, further comprising:
maintaining device location data that includes the geographic location of each of the one or more additional wireless devices and includes the current location that is assigned to the wireless device; and
maintaining node location data that includes node geographic locations of one or more communication nodes of a wireless communication service.

6. A method as recited in claim 1, wherein the one or more additional wireless devices are each configured with GPS (Global Positioning System), and the location data that is received from one or more of the additional wireless devices includes GPS coordinates that indicate the geographic location of each of the additional wireless devices.

7. A method as recited in claim 6, wherein the wireless device does not communicate a GPS signal, and wherein the current location that is assigned to the wireless device is estimated.

8. A method as recited in claim 1, wherein the current location of the wireless device is estimated based on an approximation of the determined location of the communication node.

9. A method as recited in claim 1, wherein the communication node is a cellular tower and the connection identifier is a Local Area Coverage (LAC) identifier that identifies the cellular tower.

10. A system, comprising:
at least a memory and a processor that implement a location service for wireless devices, the location service at a service layer in communication with a communication node via a communication network, the location service configured to:
receive a connection identifier that indicates a wireless device is linked to the communication node for wireless communication;
determine, based on the connection identifier, that one or more additional wireless devices are also linked to the communication node for wireless communication, the one or more additional wireless devices each configured to identify its geographic location;
receive location data that indicates the respective geographic locations of the one or more additional wireless devices;
determine a location of the communication node from the location data that is received from the one or more additional wireless devices;
assign a current location to the wireless device based on the determined location of the communication node;
receive input information from a user of the wireless device that describes a point of interest, the input information including a name of the point of interest;
store the current location of the wireless device and the input information from the user as an entry for the point of interest with the location service;
aggregate the entry with one or more other entries describing the point of interest; and
update a boundary associated with the point of interest.

11. A system as recited in claim 10, wherein the location service is further configured to initiate a request for the location data from the one or more additional wireless devices.

12. A system as recited in claim 10, wherein the location service is further configured to:
determine an estimated distance between the wireless device and the communication node based on signal strengths between the wireless device and one or more communication nodes; and
assign the current location to the wireless device based on the estimated distance.

13. A system as recited in claim 10, further comprising a database configured to:
maintain device location data that includes the geographic location of each of the one or more additional wireless devices and includes the current location that is assigned to the wireless device; and
maintain node location data that includes node geographic locations of one or more communication nodes of a wireless communication service.

14. A system as recited in claim 10, wherein the one or more additional wireless devices are each configured with GPS (Global Positioning System), and the location data that is received from one or more of the additional wireless devices includes GPS coordinates that indicate the geographic location of each of the additional wireless devices.

15. A system as recited in claim 14, wherein the wireless device does not communicate a GPS signal, and wherein the current location that is assigned to the wireless device is estimated.

16. A system as recited in claim 10, wherein the location service is further configured to estimate the current location of the wireless device based on an approximation of the determined location of the communication node.

17. A system as recited in claim 10, wherein the communication node is a cellular tower and the connection identifier is a Local Area Coverage (LAC) identifier that identifies the cellular tower.

* * * * *